United States Patent
Zeller et al.

[11] Patent Number: 5,551,886
[45] Date of Patent: Sep. 3, 1996

[54] CURRENT TRANSFER ELEMENT FOR STEERING WHEELS OF MOTOR VEHICLES

[75] Inventors: Gregor Zeller, Aschaffenburg; Helmut Bonn, Haibach, both of Germany

[73] Assignee: Petri AG, Aschaffenburg, Germany

[21] Appl. No.: 297,868

[22] Filed: Aug. 30, 1994

[30] Foreign Application Priority Data

Aug. 30, 1993 [DE] Germany .................. 43 29 116.3

[51] Int. Cl.⁶ .................................................. H01R 35/04
[52] U.S. Cl. ........................................ 439/164; 439/15
[58] Field of Search ................................. 439/15, 164

[56] References Cited

U.S. PATENT DOCUMENTS

| | | | |
|---|---|---|---|
| 4,722,690 | 2/1988 | Priede | 439/15 |
| 4,886,460 | 12/1989 | Olgren | 439/15 |
| 4,919,620 | 4/1990 | Yamaguchi et al. | 439/15 |
| 4,966,334 | 10/1990 | Bannai | 439/15 |
| 4,975,064 | 12/1990 | Takahashi et al. | 439/164 |
| 5,171,157 | 12/1992 | Bolen | 439/164 |
| 5,205,754 | 4/1993 | Kuramoto | 439/164 |
| 5,248,260 | 9/1993 | Ida et al. | 439/164 |
| 5,257,943 | 11/1993 | Ueno et al. | 439/164 |
| 5,328,378 | 7/1994 | Persson et al. | 439/15 |
| 5,334,023 | 8/1994 | Schauer et al. | 439/164 |

*Primary Examiner*—Gary F. Paumen
*Attorney, Agent, or Firm*—Fulbright & Jaworski L.L.P.

[57] ABSTRACT

A current conductor apparatus for connecting the stator of a steering column to a rotor of a steering wheel. The stator and rotor are guided concentrically with respect to one another by rotation guides and are provided with contacts for establishing an electrical connection between them. The rotor and stator are stapled to one another without being aligned by the guides. The axial and radial play between them is limited, and they may be fastened to the steering wheel and column without rotating or contacting one another. In order to facilitate the center adjustment of the apparatus, stator is provided with an attachment with a tapped hole for a screw. The screw and spring are used to hold clamp, which projects into a corresponding bore on rotor with its one elbow end and extends up to an area lying on shoulder of stator with its other end. Rotor and stator are provided with stops to limit the axial play.

3 Claims, 2 Drawing Sheets

CURRENT TRANSFER ELEMENT FOR STEERING WHEELS OF MOTOR VEHICLES

BACKGROUND OF THE INVENTION

1. Field of the Invention

The invention relates to preassembled steering wheel and steering column housings with electrical connections.

2. Description of the Related Technology

The rotation of the rotor of a steering wheel in relation to the stator of a steering column is guided by a set of rotation guides. Current transfer elements of this type are known as prefabricated assembly parts, in which the rotor and the stator are provided with rotation guides, corresponding to one another, on the inside or outside periphery and are connected by these rotation guides to an integrated component, so that the rotor and the stator form the parts of a housing enclosing the contacts. These guides are located on the inside and outside peripheries of the rotor and stator and closely correspond to one another. When it is necessary to establish an electrical connection between the steering wheel and the steering column, the connection may be enclosed in the housing formed by the rotor and the stator. The prior art discloses methods of providing a preassembled electrical current conductor connecting a steering wheel rotor and a steering column stator. The known current transfer elements have proven functionally adequate, but it is regarded as disadvantageous that, because of the direct guiding of the parts into one another in connection with their permanent installation on two components rotating against one another, the occurrence of grinding noises cannot be definitely ruled out. Although these methods have proven adequate for some purposes, they may produce grinding noises due to the misguiding of one part into another by the rotation guides. In addition, it has proven difficult to adjust the guides once installed. Moreover, difficulties arise in the adjustment, which practically rules out a preassembly of the current transfer element on the steering wheel, and makes it necessary for the current transfer element to be available separately for separate assembly in succession on the steering column. For this reason, the preassembly of a current conductor on a steering wheel rotor has been impractical. Thus, it has been necessary to provide and assemble current conductors separately from the rotor and stator of a steering system.

BRIEF DESCRIPTION OF THE INVENTION

An object of the invention is to provide a quiet, preassembled current conductor connecting a stator and a rotor.

The object is achieved by ensuring that the parts are not rotated with respect to one another during their production and preassembly. Their motion is restricted until they have been attached to the steering wheel and steering column. After the assembly on the steering column and steering wheel, they are freely rotatable, i.e., without contact of guide parts. The occurrence of friction noises during the turning of the steering wheel is thereby avoided.

A further object of the invention is to provide a current transfer element for steering wheels of motor vehicles, consisting of a stator that can be installed on the steering column and a rotor that can be installed on the steering wheel, which are guided concentrically to one another and are provided with contacts to establish an electroconductive connection between the stator and the rotor. The rotor and stator are held to one another with both axial play and radial play. Furthermore, the rotor and stator can be fastened on the steering wheel or on the steering column rotating against one another without contact.

A further object of the invention is to provide a current transfer element for steering wheels, wherein for the purpose of center adjustment of the current transfer element, the stator is provided with an attachment with tapped hole for a screw, which uses the holding device of a clamp, doubly bent at right angles and acted on by a spring, which projects with its one elbow end in a corresponding adjusting bore of rotor and extends with its other end up to an area lying on shoulder formed on stator.

A further object of the invention is to provide a current transfer element for steering wheels, wherein rotor and stator are provided with stops for limiting the axial play.

A further object of the invention is to provide a current transfer element for steering wheels, wherein the stops are formed by a centering ring on rotor as well as an annular flange on stator simultaneously using a shoulder as limit of lift for clamp.

DESCRIPTION OF THE DRAWINGS

An embodiment of the invention is diagrammed in the following drawings.

DETAILED DESCRIPTION OF THE PREFERRED EMBODIMENT

Figure 4:
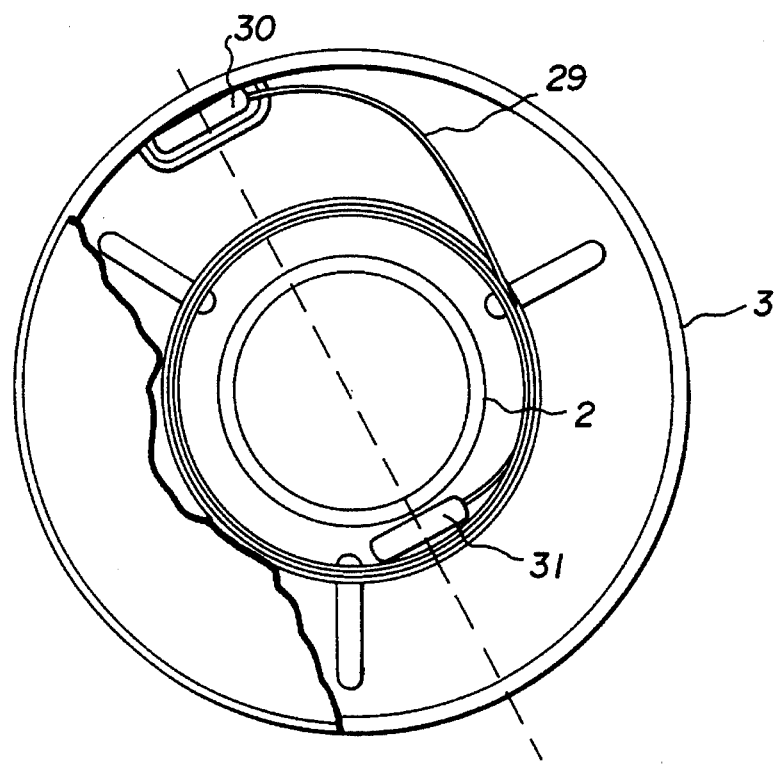
FIG. 4 diagrams a steering wheel housing consisting of a rotor, a stator, and a conducting strip.

A steering wheel housing is diagrammed in FIG. 4. The stator 3 may be fastened to a steering column, and the rotor 2 may be fastened to a steering wheel. Stator 3 and rotor 2 form a housing and define an annular space, in which several turns of a conductor strip 29 are loosely wound around the rotor. The conductor strip 29 establishes an electrical connection between the steering wheel and the steering column. This is necessary for the functioning of any electrical device, such as a safety airbag, mounted in the steering wheel. When properly wound, the conductor strip 29 allows for the rotation of the rotor through three complete revolutions. The ends of conductor strip 29 are attached to conductor outlets 30 and 31.

In the process of attaching the rotor to the steering wheel and the stator to the steering column, it is necessary to ensure that the conductor strip is properly wound in relation to the degree of rotation of the steering mechanism and the front wheels of the vehicle. If the relation is improper, that is the conductor strip is wound too tight or too loose, the strip will impede the rotation of the steering wheel through the desired three rotations, resulting in limited steering capacity or a broken conductor strip. The process of ensuring that the conductor strip is in a proper relation with the degree of rotation of the steering mechanism is called center adjustment.

Figure 1:
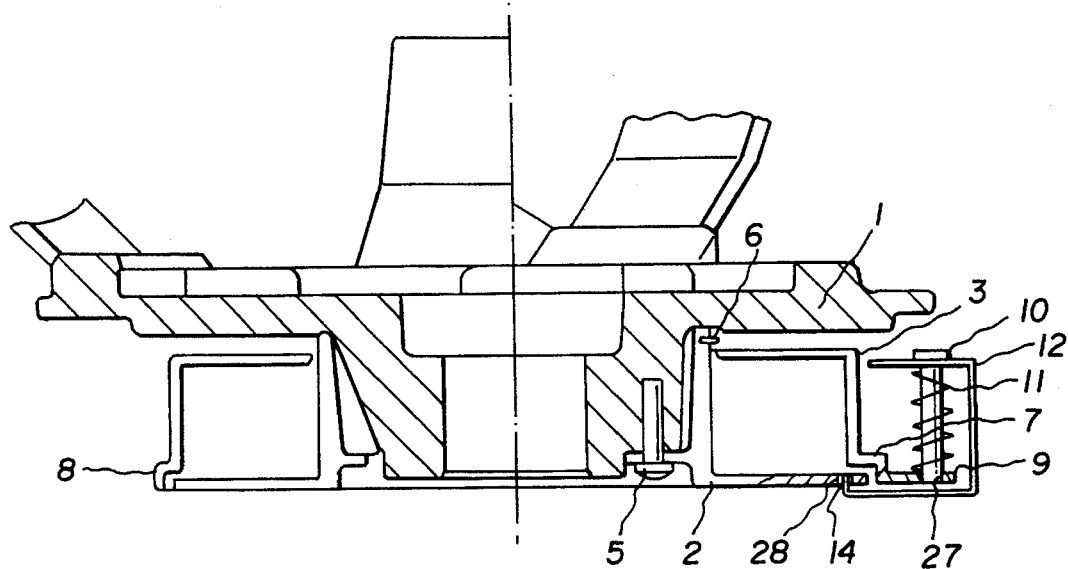
FIG. 1 and FIG. 2 are drawings of a first embodiment of the current conductor according to the invention.

In FIG. 1, steering wheel 1, rotor 2, and stator 3 are shown. Rotor 2 and stator 3 are held together by double clamp 12. The axial play between the rotor and the stator is limited by two stops: a centering ring 6 on rotor 2, and an annular flange 8 on stator 3. The flange 8 forms a shoulder 7 which may rest against the edge of the rotor. The rotor and the steering wheel may be preassembled and attached to one another by screw 5. The stator is further provided with an attachment 9 with a tapped hole 27 for a screw 10. The double clamp 12 is held between spring 11 and the head of screw 10. The clamp is doubly bent at right angles to form an elbow end 14 and an end 15. Elbow end 14 is positioned in a corresponding adjustment bore 28 of rotor 2. End 15 extends up to shoulder 7 of stator 3, so that the shoulder serves as a stop for clamp 12. Elbow end 14 is held in the bore 28 of the rotor by screw 10 and spring 11. In addition, the stator is held in place by its annular flange 8 resting on the edge of rotor 2. The rotation of stator 3 relative to rotor 2 is thus prevented.

Figure 2:
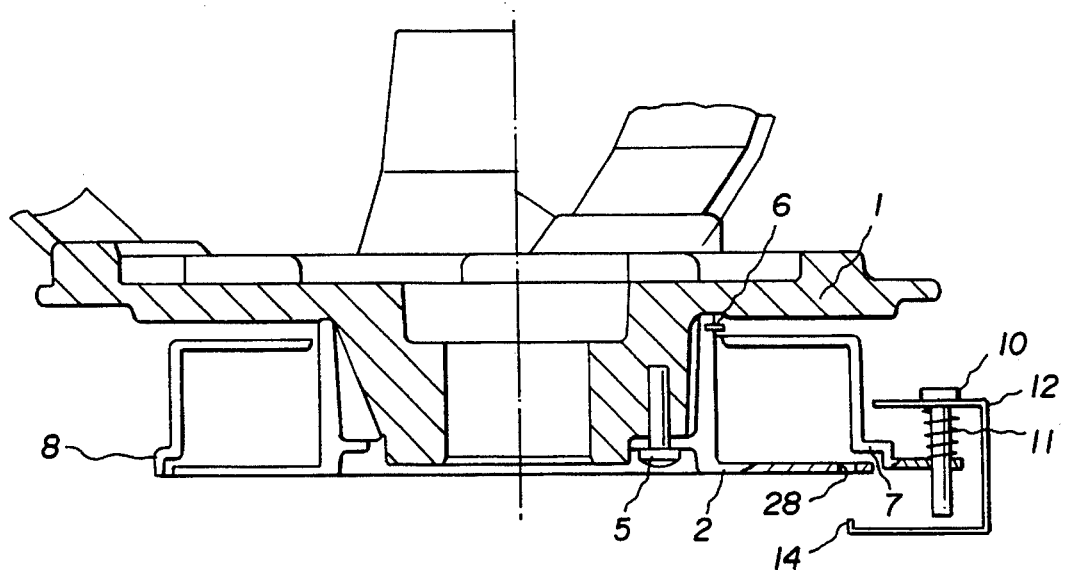

After the rotor and stator have been attached to the steering wheel and the steering column, and the proper center adjustments have been made, the rotor may be released, as shown in FIG. 2, by screwing-in screw 10 and compressing spring 11 until elbow end 14 has completely exited the bore 28 of the rotor or until it has stopped on shoulder 7. The rotor and stator may now be freely rotated in relation to one another.

Figure 3:
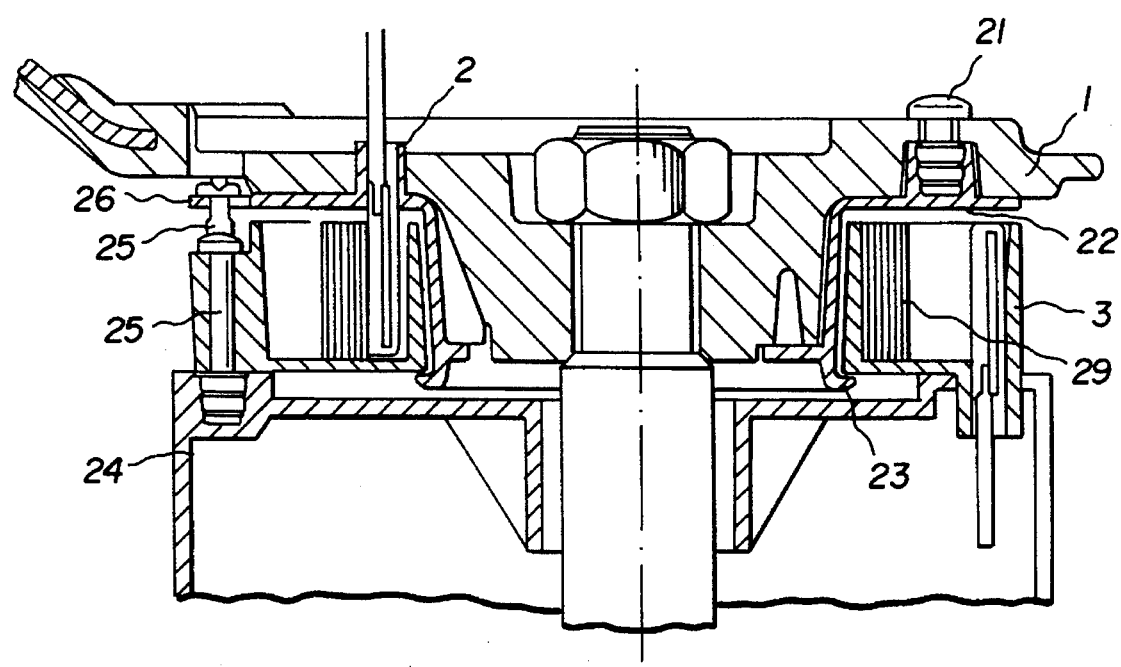
FIG. 3 is a second embodiment of the current conductor.

FIG. 3 shows a second embodiment of the current conductor according to the invention. Corresponding parts are designated with the same reference numbers as in FIG. 1 and FIG. 2. The rotor is fastened to steering wheel i with screw 21. Rotor 2 and stator 3 are stapled to one another by the stops formed by extension 22 and the annular flange 23 of rotor 2. Screw 25, which may be one of the stator fastening screws, may be screwed into stator 3 or steering column 24. The head of screw 25 coincides with recess 26 of the rotor. Recess 26 has a diameter that exceeds the diameter of the head of screw 25. During the center adjustment, screw 25 is unscrewed to the extent that its head projects through rotor recess 26 and forms a rotating stop for rotor 2. After the assembly of the current conductor apparatus, screw 25 is screwed tightly until its head leaves the area of recess 26. Rotor 2 is thus free to rotate.

We claim:

1. A current conductor apparatus for a stator of a steering column and for a rotor of a steering wheel comprising:

a stator;

a rotor;

an attachment located on the stator;

a screw located in a tapped hole on the attachment;

a clamp comprising an elbow end and an other end;

a spring;

a bore located on the rotor, and a shoulder located on the stator, wherein the clamp and the attachment are attached to one another by the screw and the spring, the elbow end is configured so that it may project into the bore, and the other end is configured so that it may lie on the shoulder.

2. A current conductor apparatus according to claim 1, further comprising stops configured to limit axial play between the rotor and the stator.

3. A current conductor apparatus according to claim 2, wherein the stops comprise a centering ring located on the rotor, an annular flange located on the stator, and a shoulder as a limit of lift for the clamp.

\* \* \* \* \*